United States Patent
Matusov et al.

(10) Patent No.: US 12,327,091 B2
(45) Date of Patent: Jun. 10, 2025

(54) SYSTEM AND METHOD FOR DIRECT SPEECH TRANSLATION SYSTEM

(71) Applicant: Applications Technology (AppTek), LLC, McLean, VA (US)

(72) Inventors: Evgeny Matusov, Aachen (DE); Jintao Jiang, Great Falls, VA (US); Mudar Yaghi, McLean, VA (US)

(73) Assignee: Applications Technology (AppTek), LLC, McLean, VA (US)

( * ) Notice: Subject to any disclaimer, the term of this patent is extended or adjusted under 35 U.S.C. 154(b) by 0 days.

(21) Appl. No.: 16/741,477

(22) Filed: Jan. 13, 2020

(65) Prior Publication Data
US 2020/0226327 A1    Jul. 16, 2020

Related U.S. Application Data

(60) Provisional application No. 62/791,373, filed on Jan. 11, 2019.

(51) Int. Cl.
*G06F 40/58* (2020.01)
*G06F 18/214* (2023.01)
(Continued)

(52) U.S. Cl.
CPC ............ *G06F 40/58* (2020.01); *G06F 18/214* (2023.01); *G06F 40/42* (2020.01); *G06N 3/08* (2013.01);
(Continued)

(58) Field of Classification Search
CPC ........ G06F 40/58; G06F 40/42; G06F 40/263; G06N 20/00; G06N 3/08; G06K 9/6256;
(Continued)

(56) References Cited

U.S. PATENT DOCUMENTS 9,195,656 B2 * 11/2015 Fructuoso ............... G10L 13/10
10,402,500 B2 * 9/2019 Chochowski ........... G10L 17/00
(Continued)

FOREIGN PATENT DOCUMENTS

| CN | 108780643 A | * | 11/2018 | ........... G10L 13/086 |
| KR | 20190125863 A | * | 11/2019 | ............. G06F 40/51 |
| WO | WO-2019139431 A1 | * | 7/2019 | ............. G06F 40/40 |

OTHER PUBLICATIONS

Long Duong, Antonios Anastasopoulos, David Chiang, Steven Bird, Trevor Cohn "An Attentional Model for Speech Translation Without Transcription" Association for Computational Linguistics N16-1109 (Year: 2016).*

(Continued)

*Primary Examiner* — Richemond Dorvil
*Assistant Examiner* — Alexander G Marlow
(74) *Attorney, Agent, or Firm* — Bertin IP Law, PC; Robert Bertin (57) ABSTRACT

A system for translating speech from at least two source languages into another target language provides direct speech to target language translation. The target text is converted to speech in the target language through a TTS system. The system simplifies speech recognition and translation process by providing direct translation, includes mechanisms described herein that facilitate mixed language source speech translation, and punctuating output text streams in the target language. It also in some embodiments allows translation of speech into the target language to reflect the voice of the speaker of the source speech based on characteristics of the source language speech and speaker's voice and to produce subtitled data in the target language corresponding to the source speech. The system uses models having been trained using (i) encoder-decoder architectures with attention mechanisms and training data using TTS and (Continued)

(ii) parallel text training data in more than two different languages.

16 Claims, 5 Drawing Sheets

(51) Int. Cl.
*G06F 40/42* (2020.01)
*G06N 3/08* (2023.01)
*G06N 20/00* (2019.01)
*G10L 13/00* (2006.01)
*G10L 25/90* (2013.01)

(52) U.S. Cl.
CPC .............. *G06N 20/00* (2019.01); *G10L 13/00* (2013.01); *G10L 25/90* (2013.01)

(58) Field of Classification Search
CPC ......... G10L 13/00; G10L 25/90; G10L 15/00; G10L 13/033
See application file for complete search history.

(56) References Cited

U.S. PATENT DOCUMENTS

| | | | |
|---|---|---|---|
| 11,195,507 B2* | 12/2021 | Kumar | H04N 21/440236 |
| 2015/0254238 A1* | 9/2015 | Waibel | G06F 40/58 704/4 |
| 2016/0147740 A1* | 5/2016 | Gao | G10L 15/063 704/2 |
| 2016/0379622 A1* | 12/2016 | Patel | G10L 13/06 704/260 |
| 2018/0261225 A1 | 9/2018 | Watanabe et al. | |
| 2019/0164554 A1* | 5/2019 | Huang | G06F 16/3329 |
| 2019/0244623 A1* | 8/2019 | Hall | G06F 40/58 |
| 2019/0332677 A1* | 10/2019 | Farhan | G06F 40/51 |

OTHER PUBLICATIONS

Jan Chorowski, Navdeep Jaitly "Towards better decoding and language model integration in sequence to sequence models" Cornell University arXiv:1612.02695v1 (Year: 2016).*

Alexandre Bérard, Laurent Besacier, Ali Can Kocabiyikoglu, Olivier Pietquin "End-to-End Automatic Speech Translation of Audiobooks" Cornell university arXiv:1802.04200v1 (Year: 2018).*

Sameer Bansal, Herman Kamper, Adam Lopez, Sharon Goldwater "Towards speech-to-text translation without speech recognition" Cornell University arXiv:1702.03856v1 (Year: 2017).*

Matthias Sperber, Graham Neubig, Jan Niehues, Alex Waibel; Attention-Passing Models for Robust and Data-Efficient End-to-End Speech Translation. Transactions of the Association for Computational Linguistics 2019; 7 313-325. (Year: 2019).*

Melvin Johnson, Mike Schuster, Quoc V. Le, Maxim Krikun, Yonghui Wu, Zhifeng Chen, Nikhil Thorat, Fernanda Viégas, Martin Wattenberg, Greg Corrado, Macduff Hughes, Jeffrey Dean "Google's Multilingual Neural Machine Translation System: Enabling Zero-Shot Translation" Cornell University arXiv:1611.04558 (Year: 2017).*

Yuxuan Wang, RJ Skerry-Ryan, Daisy Stanton, Yonghui Wu, Ron J. Weiss, Navdeep Jaitly, Zongheng Yang, Ying Xiao, Zhifeng Chen, Samy Bengio, Quoc Le, Yannis Agiomyrgiannakis, Rob Clark, Rif A. Saurous "Tacotron: Towards End-to-End Speech Synthesis" Cornell University arXiv:1703.10135v2 (Year: 2017).*

Melvin Johnson, Mike Schuster, Quoc V. Le, Maxim Krikun, Yonghui Wu, Zhifeng Chen, Nikhil Thorat, Fernanda Viégas, Martin Wattenberg, Greg Corrado, Macduff Hughes, Jeffrey Dean "Google's Multilingual Neural Machine Translation System: Enabling Zero-Shot Translation" Cornell University arxXiv:1611.04558(Year: 2017).*

Takatomo Kano, Sakriani Sakti, Satoshi Nakamura "Structured-based Curriculum Learning for End-to-end English-Japanese Speech Translation" Cornell University arXiv:1802.06003v1 (Year: 2018).*

Ron J. Weiss, Jan Chorowski, Navdeep Jaitly, Yonghui Wu, Zhifeng Chen, "Sequence-to-Sequence Models Can Directly Translate Foreign Speech" Cornell University arXiv:1703.08581v2 (Year: 2017).*

Melvin Johnson, Mike Schuster, Quoc V. Le, Maxim Krikun, Yonghui Wu, Zhifeng Chen, Nikhil Thorat, Fernanda Viégas, Martin Wattenberg, Greg Corrado, et al. "Google's Multilingual Neural Machine Translation System: Enabling Zero-Shot Translation" Cornell University arxXiv:1611.04558 (Year: 2017).*

M. Akagi, eta l. "Emotional Speech Recognition and Synthesis in Multiple Languages toward Affective Speech-to-Speech Translation System," 2014 Tenth International Conference on Intelligent Information Hiding and Multimedia Signal Processing, pp. 574-577, doi: 10.1109/IIH-MSP.2014.148. (Year: 2014).*

Alexandre Berard, Olivier Pietquin, Christophe Servan, Laurent Besacier "Listen and Translate: A Proof of Concept for End-to-End Speech-to-Text Translation" Cornell University arXiv:1612.01744v1 (Year: 2016).*

A. Tsiartas, P. G. Georgiou and S. S. Narayanan, "A study on the effect of prosodic emphasis transfer on overall speech translation quality," 2013 IEEE International Conference on Acoustics, Speech and Signal Processing, Vancouver, BC, Canada, 2013, pp. 8396-8400, doi: 10.1109/ICASSP.2013.6639303. (Year: 2013).*

Melvin Johnson, Mike Schuster, Quoc V. Le, Maxim Krikun, Yonghui Wu, Zhifeng Chen, Nikhil Thorat, Fernanda Viégas, Martin Wattenberg, et al. "Google's Multilingual Neural Machine Translation System: Enabling Zero-Shot Translation" Cornell University arxXiv:1611.04558 (Year: 2017).*

Alexandre Berard, Olivier Pietquin, Christophe Servan, Laurent Besacier "Listen and Translate: A Proof of Concept for End-to-End Speech-to-Text Translation" Cornell University arXiv:1612.01744v1 (Year: 2016).*

M. Akagi, X. Han, R. Elbarougy, Y. Hamada and J. Li, "Emotional Speech Recognition and Synthesis in Multiple Languages toward Affective Speech-to-Speech Translation System," Tenth International Conference on Intelligent Information Hiding and Multimedia Signal Processing doi: 10.1109/IIH-MSP.2014.148 (Year: 2014).*

Sunit Sivasankaran, Brij Mohan Lal Srivastava, Sunayana Sitaram, Kalika Bali, Monojit Choudhury. Phone Merging for Code-switched Speech Recognition. Third Workshop on Computational Approaches to Linguistic Code-switching, collocated with ACL 2018 Jul. 2018, Melbourne, Australia (Year: 2018).*

International Search Report and Written Opinion dated Apr. 16, 2020, in corresponding International Application No. PCT/US2020/013311.

* cited by examiner

SYSTEM AND METHOD FOR DIRECT SPEECH TRANSLATION SYSTEM

CROSS-REFERENCE TO RELATED APPLICATION(S)

This application claims the priority of U.S. Provisional Application No. 62/791,373, filed on Jan. 11, 2019, the entirety of which is hereby incorporated by reference.

FIELD OF THE INVENTION

The present invention relates generally to multi-lingual speech translation systems and, more particularly, to an efficient approach for multi-lingual speech translation systems based on eliminating separate automatic speech recognition (ASR) systems and machine translation (MT) systems associated with separate language pairs and instead training a multi-lingual speech translation system followed by a TTS system for direct multi-lingual speech to speech translation.

BACKGROUND OF THE INVENTION

In a typical speech translation system, multi-lingual translation presents challenges. Separate systems for each language generally must be used in the recognition and translation processes. Moreover, when a speech signal includes mixed languages embedded within it, the recognition and translation processes are made more difficult.

Consider the process of translating mixed French speech, German speech, and Spanish speech to English speech as an example. A conventional system of such type usually involves three automatic speech recognition (ASR) systems (French, German, and Spanish), three machine translation (MT) systems (French to English, German to English, and Spanish to English), one language identification (LID) system, and one automatic text-to-speech (TTS) system for English. Thus, in training the system, seven models need to be trained. The post training application of the system involves a LID process on a speech signal to identify the applicable language, an ASR process on the speech signal to recognize text corresponding to the speech signal in a source language, a MT process for translating the source text into a target language text, and a TTS process to create speech from the target text in the target language. Such a system is complex and involves stringing together multiple systems for serial processing. It is also relatively demanding on computing resources.

There is a need for a new system for multi-lingual speech translation that is simpler compared to the regular one. There is a further need for a speech translation system that only requires one system to be trained, instead of seven. On the application side, there is a further need for a single multi-lingual speech translation system and process and TTS system and process to directly translate from speech in one language to speech in another.

SUMMARY OF THE INVENTION

According to an embodiment of the present invention, a system for translating speech from at least two source languages into another target language provides direct speech to target language translation. The target text is converted to speech in the target language through a TTS system. The system simplifies speech recognition and translation by providing direct translation, and includes mechanisms described herein that facilitate mixed language source speech translation, and punctuating output text streams in the target language. In some embodiments systems and method of the present invention allow translation of speech into the target language to reflect the voice of the speaker of the source speech based on characteristics of the source language speech and to produce subtitled data in the target language corresponding to the source speech. The system uses models having been trained using (i) encoder-decoder architectures with attention mechanisms and training data using TTS and (ii) parallel text training data in more than two different languages.

According to one embodiment of the invention, a system for translating speech associated with at least two source languages into another target language comprises a voice activity module, a direct multi-lingual speech translation module and a text to speech module. The voice activity module is coupled to a source of speech signals. It is configured to receive and process source speech signals and generate language labels, speaker diarization and voice characteristics meta-information associated with the source speech signals. The direct multi-lingual speech translation module is coupled to the source of speech signals and the voice activity module and is configured to receive and process the source speech signals and the voice activity module output to generate a text stream output in a target language with punctuation prediction information. The text to speech module is coupled to the source of speech signals, the voice activity module and the direct multi-lingual speech translation module. It is configured to generate speech in the target language, based on the text stream output in the target language and punctuation prediction information, speaker diarization and voice characteristics meta-information. The generated speech in the target language mimics the voice of the speaker of the source speech signals. The system may further include a subtitle segmentation module, coupled to the direct multi-lingual speech translation module and the voice activity module. It is configured to generate subtitles in the target language corresponding to the source speech. The direct multi-lingual speech translation module may be configured to determine predicted sentence boundaries based on the speaker diarization and language labeling and generate full-sentence target language translation based on the predicted sentence boundaries.

According to another embodiment of the invention, a system for training a multi-lingual direct speech to text translation module includes a memory, a text to speech system and a processor. The memory stores program instructions for training direct speech translation models using multilingual encoder-decoder architectures with attention mechanisms. The text to speech (TTS) system is associated with the target language and generates speech from multi-lingual parallel text training data in the target language. The processor is coupled to the memory and a source of speech in a source language for translation to the target language. The processor is configured to execute the program instructions to produce training data using the TTS system and the source language side of parallel text training data, including the multilingual parallel text training data with different source languages, such that the produced training data includes the TTS generated speech signal generated from the parallel data. The training system may further be configured such that the processor executes the program instructions to process multi-lingual parallel training data to train an end-to-end multi-lingual speech-to-speech system. The system may further be configured such that the processor executes the program instructions to perform multilingual, multi-objective training to enhance the model training multi-lingual parallel training data to train the end-to-end multi-lingual speech-to-speech system.

According to another embodiment of the invention, a system for translating speech into another language includes a memory and a processor. The memory includes program instructions, for performing direct speech translation for more than two language pairs using models having been trained using (i) encoder-decoder architectures with attention mechanisms and training data using TTS and (ii) parallel text training data in more than two different languages. The processor is a processor coupled to the memory for executing the program instructions to: (a) process an input audio file having speech therein spoken in at least one language to create text output in a target language, and (b) convert the text output into speech in the target language using TTS. The system may receive the speech input signal from a network or database coupled to the processor or a microphone and may output the translated speech to a databased, the network or speakers. The system may further include program instructions stored in the memory for receiving prosody and/or sentiment characteristics of speech in the input stream and adjusting the prosody and/or sentiment characteristics of the TTS speech output based on the prosody and/or sentiment characteristics. In this manner, the system may translate multi-lingual speech to a target language in a direct manner and optionally translate prosody and sentiment information into the translated speech.

According to another embodiment of the invention, a method for translating speech into another language includes steps of training, processing and converting. The training includes training multi-lingual direct speech to text translation models for more than two language pairs using (i) encoder-decoder architectures with attention mechanisms and training data using TTS and (ii) parallel text training data in the more than two different language pairs. The processing includes processing an input speech signal in at least one of the languages among the at least two language pairs to output a stream of text in a target language. The converting includes converting the text output into speech in the target language using TTS. The method may include receiving prosody characteristics associated with the speech in the input stream and adjusting the prosody characteristics of the TTS speech output based on the prosody characteristics.

BRIEF DESCRIPTION OF THE FIGURES

The above described features and advantages of embodiments of the present invention will be more fully appreciated with reference to the detailed description and the appended figures described below.

DETAILED DESCRIPTION

The following describes a new approach for a multi-lingual speech translation system and method, both in terms of training models to be implemented in a multi-lingual speech translation system and the use of the system in applications.

BACKGROUND

Figure 1A:
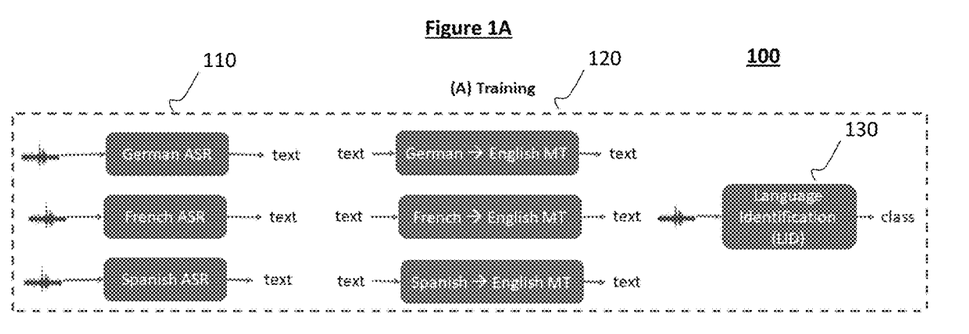
FIG. 1A depicts an illustrative block diagram of a system for performing speech-to-speech translation in different languages according to the prior art.
Figure 1B:
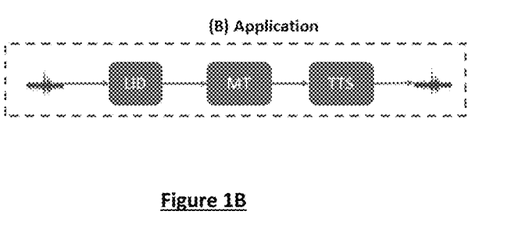
FIG. 1B depicts an illustrative block diagram of the prior art system implementing an application.

To simplify the description, we use translating mixed French speech, German speech, and Spanish speech to English speech as an example. FIG. 1A depicts an illustrative block diagram of a system 100 for performing speech-to-speech translation in different languages according to the prior art. Referring to FIG. 1A, the conventional system includes, on the training side, three separate ASR systems 110 (French, German, and Spanish), three separate MT systems 120 being trained (French to English, German to English, and Spanish to English), and one LID system. On the decoding side, as shown, there are multiple systems: LID, ASR systems, and MT systems to go from multi-lingual speech to target language text, followed by a TTS system. Referring to FIG. 1B, the LID (including 3 separate ASR systems) selects the applicable language and ASR system from which to take the text and feed it to the corresponding MT system. The ASR systems can be hybrid systems (hidden markov model (HMM) systems and neural networks) or can be end-to-end systems such as encoder-decoder, Connectionist Temporal Classification (CTC). The MT system can be statistical MT or neural MT.

The systems shown in FIGS. 1A and 1B may translate speech from a set of languages into a target language. However, it is cumbersome because of the many the separate systems involved and may not do a good job of translating speech when the input speech includes multiple different languages interspersed in the input stream.

Encoder-Decoder Architectures with Attention Mechanisms

Recent advances in sequence-to-sequence neural modelling, particularly using encoder-decoder architectures with attention mechanisms, have led to breakthroughs in ASR and especially MT. TTS generation systems have also been shown to be competitive using this architecture. The architecture is very similar across all three tasks and there are few assumptions about the input and output, which are basically sequences of vectors.

This flexibility has enabled different experiments according to embodiments of the present invention, in which parameters are shared both across tasks (e.g. direct speech translation) and across languages (e.g. multilingual neural MT, where a single system can translate from multiple languages or even a mix of languages in a single sentence).

Using TTS to Generate Training Triples for Direct Speech

A direct speech translation system uses as training data pairs of foreign speech signal and the corresponding utterance translated into the target (e.g. English) language. Usually, also the transcript of the utterance in the foreign language is available. However, such resources are scarce and expensive to prepare. In this application, according to an embodiment of the present invention, we extend the resources for a direct speech translation system by leveraging bilingual training data that is used for text translation.

Such data are present in large quantities (millions of words) for the main language pairs of interest. The size of these data is much larger than the size of the spoken words in the data usually available for training an ASR system. According to an embodiment, the audio is generated for the source language side of the parallel, sentence-aligned language MT training data using a TTS system, for example a state of the art TTS system, for all source languages involved in the proposed multi-lingual direct speech translation system. This leads to triples (source speech signal, source sentence, target sentence) in large quantities, where the source speech signal would be (for the most part) generated automatically. According to one embodiment, these triples may be used to train a high-quality direct speech translation system. The tight coupling of ASR and MT in the single encoder-decoder architecture with attention mechanism of such a system can potentially avoid some ASR errors and thus more correctly convey the content of the spoken utterance. The reliance on the large MT training resources (made possible with the proposed usage of the TTS system for generating training data) may make this system comparable or better in terms of general MT quality than a cascade of an ASR system and an MT system. Having only one system would also save computing/deployment resources.

Using TTS data generation enables taking advantage of a large amount of diverse speech data in existing languages, for example, English. That is, the speaker and channel characters will be analyzed and modeled. Existing TTS software may be used to model speaker and other artifacts. Then, these models may be used to create diverse TTS audio signals to deal with overfitting and increase noise-robustness. The TTS audio signals may be used to learn how the target text output is related to acoustic embeddings across languages. The underlying acoustic modeling may be based, among other things, on the existing large amount of data for each of the source languages of the proposed multilingual system.

A Multi-Lingual Framework

According to still another embodiment of the invention, the direct translation system described above may be extended to handle multiple input languages. Like multilingual text translation, the parameters of the neural encoder-decoder model may be shared between multiple source languages. To this end, TTS systems for different languages can be used to create speech signal automatically for a collection of parallel MT training sets with different source languages, but the same target language. In turn, the multi-lingual direct translation system may be trained on these data in order to be able to directly translate speech from speakers in multiple languages or even a mix of languages in a single utterance of a single speaker. For instance, it would be possible to translate or transcribe a recording of a person speaking a mix of English and Spanish, or French and Arabic.

Moreover, because state-of-the-art TTS systems yield speech signal differing not only in speaker (e.g. female/male), but also in dialect and pronunciation, the system may be trained with dialect and pronunciation information to translate speech spoken in multiple dialects or a mix of dialects, as well as speech of people speaking a foreign language with a particular accent. In the end, implementing a single multilingual direct speech translation system according to an embodiment of the invention as described herein saves costs for developing an ASR system for each of the involved foreign languages or dialects, as well as for developing the same number of bilingual MT systems for translating utterances in each of these languages to English.

An illustrative System

Figure 2:
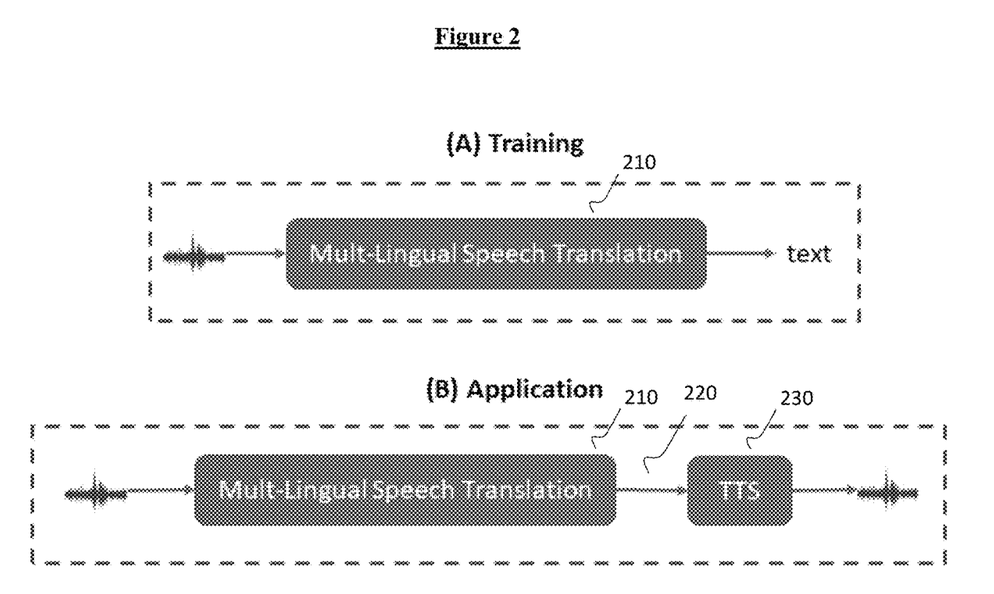
FIG. 2 represents an illustrative image of the proposed system that perform multi-lingual speech-to-speech translation in a simple workflow.

An illustrative system is shown in FIG. 2 for direct, multi-lingual speech translation. Referring to FIG. 2, a multi-lingual speech to text system 210 is trained as described above. This produces test streams in different languages from an input speech signal. The output of the multi-lingual speech to text system then sends the stream of text in the target language to a TTS system that in the application outputs speech in the target language. According to one embodiment, the approach uses an encoder-decoder neural model where speech is both input and output (through TTS), but in different languages, as shown in FIG. 2. Existing speech signal from movies (e.g. documentaries), coupled with caption in a different language, can be used to train the proposed speech translation system. Because this system is a speech generation system, it could be also adapted to mimic the speaker qualities of the original speaker. Thus, the automatically TTS produced speech can be fine-tuned to have the same prosody and sentiment as the original speech. Together with the multilingual and multi-dialect extension described above, a single neural speech translation system will have the ability to interpret foreign language speech similarly to a multilingual human interpreter.

Figure 3:
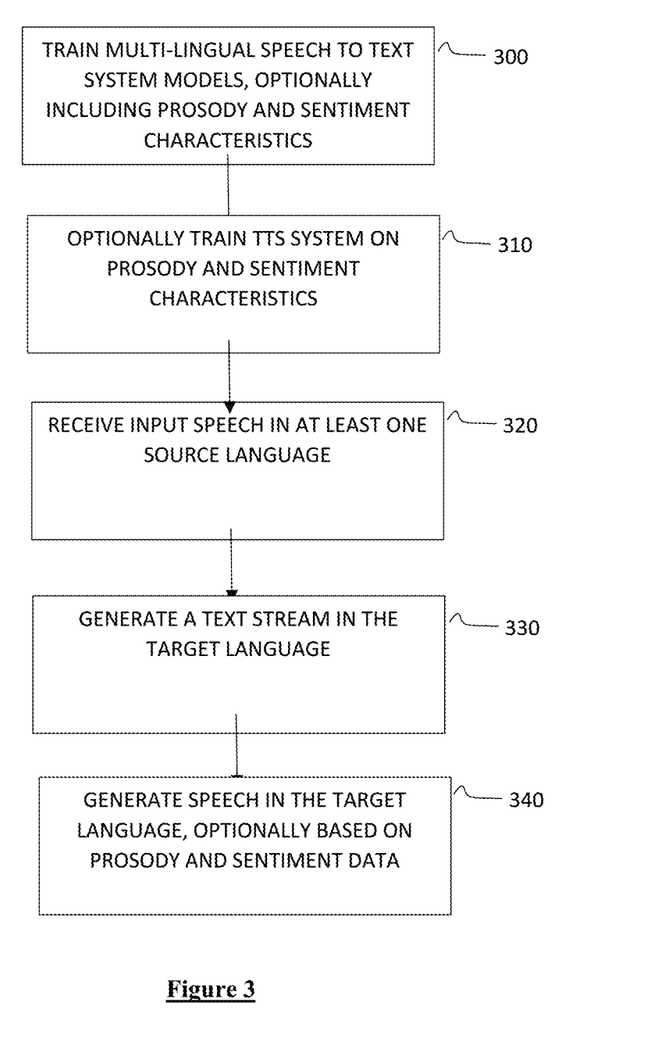
FIG. 3 illustrates a method converting an input stream of source speech into a target stream, according to an embodiment of the present invention.

FIG. 3 depicts a method according to an embodiment of the invention. Referring to FIG. 3, in step 300, multi-lingual direct speech to text translation models are trained. This may be done in various manners including those described above. According to the present invention, at least two language pairs are implemented in the training to train the direct speech to text system to translate for example French and Germany to English and vice versa. There is no limit to the number of language pairs that may be included.

The models may further include data on characteristics of the speech that are not reflected in a stream of text, such as prosody information and/or sentiment information. This information may be conveyed to a TTS system associated with the multi-lingual direct speech to text system and used to adjust the speech output of the TTS system. In this manner, the speech to speech translation can be made to output speech that not only reflects a high fidelity translation of the input text stream, but also translates prosody and sentiment information into the target language. Such as system is ideally suited to speech translation in applications such as creating audio streams in different languages for television and movies.

Architecture Description

Figure 5:
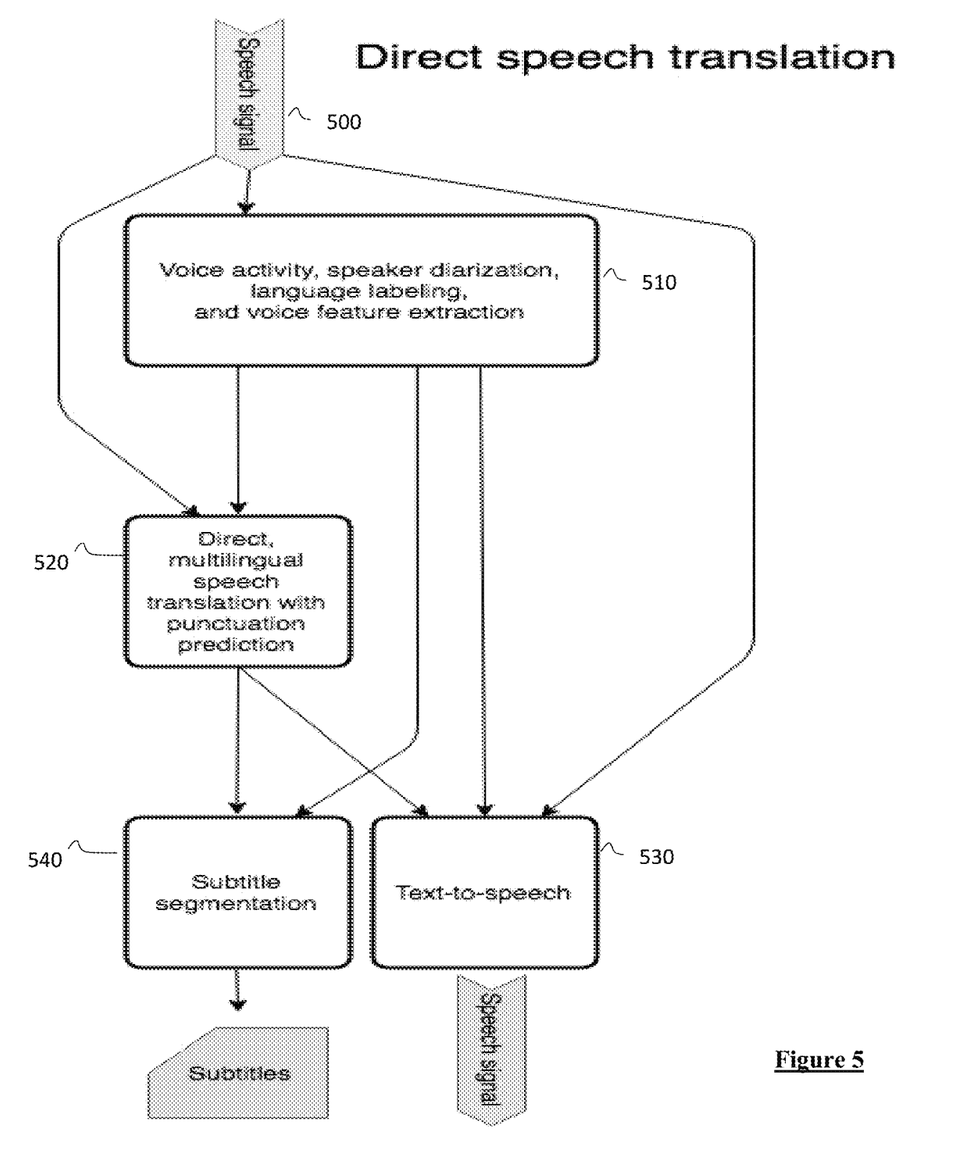
FIG. 5 depicts an illustrative view of a system according to an embodiment of the present invention that performs multi-lingual speech-to-speech translation in an end-to-end workflow.

FIG. 5 depicts an illustrative embodiment of a direct speech translation system that accepts a speech signal as an input and outputs a speech signal in a target language and optionally subtitles in the target language corresponding to the speech signal input. The system may be implemented broadly in a variety of applications, including in a content generation system implemented to provide closed captioning and multi-lingual support for television or movies. Referring to FIG. 5, the direct speech translation system architecture includes a main component-the direct speech translation system 520, as well as two supporting components: the voice activity detection and speaker diarization module 510 that precedes the translation process, as well as the TTS component 530 that may follow the translation to generate target language speech. In addition, an optional subtitle generation component may be implemented, to converts the translated output to subtitles for display on a (television) screen. FIG. 3 depicts all the components in interaction.

The voice activity detection and speaker diarization system or module 510 is designed to work in multilingual, multi-speaker settings, when there is speaker change between speakers who speak possibly different languages. It may also handle mixed-language speech from the same or multiple speakers. The input to the module 510 is a speech signal in the form of a way file or input audio stream and its output is provided to the direct translation module 520, the TTS 530 and optionally the subtitle segmentation module 540. The module 510 performs the following segmentation and labeling decisions, some of which are performed not separately, but in dependency on each other. Also, some of these decisions are soft, i.e. they can be potentially overridden by the direct speech translation component.

1. Voice activity detection (VAD): separation of speech events from non-speech (music, background noise, silence). The information on start and duration of each speech event is identified and passed on to the next component.
2. Speaker diarization: the system detects speaker changes and assigns speaker labels with probabilities for the given speech segment to belong to a particular speaker. The system also generates metadata with speaker characteristics (e.g. male or female, pitch, etc.). These voice characteristics data are passed on to the TTS component so that the target language speech may be generated based on the voice characteristics data of the source language speaker if this is desired to produce a vocally similar voice in the target language speech for each speaker. In addition, these characteristics, especially speaker gender, are important for generating a correct translation for some target languages (e.g. correct pronoun or verb form) and thus will be used by the direct translation system or module 520. According to one embodiment, a speaker diarization algorithm is implemented that is multi-lingual.
3. Language identification: although the subsequent speech translation component 520 is multilingual, i.e. can handle inputs in multiple languages, it may be important to recognize the language(s) of the speaker and pass this information to the multilingual direct speech translation component 520 in some embodiments. For example, language identification information provided on a granular basis may be used as a feature for higher-quality MT of a given language or mix of languages. The information may also be used to filter out speech in languages that are not supported by the MT component or that are otherwise not desired to be translated as part of the MT.

All of this information is provided as meta-information and is passed to the direct speech translation component 520 together with the original audio signal. According to an embodiment of the invention, the direct speech translation component may receive the audio signal and the output from the module 510, and it may perform the following operations as part of generating and outputting text and punctuation information to a TTS system 530 and optionally a subtitle segmentation system 540:

1. The speech events as identified by the VAD module 510 are converted to a sequence of acoustic vectors, each vector summarizing 25 milliseconds of the audio signal for every 10 milliseconds.
2. The audio signal is fed into, for example, a multi-layer recurrent neural network (RNN) encoder (Bidirectional LSTM, etc.) that transforms the input vector representation into another vector representation that corresponds to a sequence of vectors which are assigned to speech states (e.g. HMM states corresponding to a phoneme/triphone sequence of a word). This vector representation is given by the last layer of the proposed RNN.
3. In one example embodiment, the direct speech translation component is also used to, explicitly or implicitly, predict sentence boundaries so that it can generate translations of full target sentences with punctuation. Here, by sentences we mean syntactic/semantic units which are usually the units of processing in machine translation. They are different from the usual acoustic utterance segmentation that is in most cases based on pauses. The sentence boundary detection functionality described herein may be based on pause duration information but may be trained as part of the training process to predict sentence boundaries which correspond to the end of a source language sentence (and beginning of a next sentence). For instance, it may detect that pauses which a hesitating speaker made in the middle of a sentence are not good sentence boundary candidates. At the same time, when a fast speaker directly starts a new sentence without making a pause after the previous one, a sentence boundary may still be detected. In an example embodiment, this may be achieved based on the implicit word representation that is given by the past and (in case of batch processing) future vectors in the last layer of the RNN encoder.

In addition, according to an embodiment of the invention, voice characteristics information may be used as additional features to predict a sentence boundary. For example, a sentence start is usually characterized by a higher speech volume, where as the voice is lowered towards the end of the sentence. Also, co-articulation usually happens in the middle of a sentence but not in the beginning. Finally, in one example embodiment, the direct speech translation component 520 may define sentence boundaries (hard boundary decisions) based on speaker diarization and language identification metadata from component 510. Alternatively, the speech translation component 520 may decide to ignore these metadata and rely solely on a hidden word sequence representation to define a sentence boundary. For example, a detected speaker change may be ignored, if the two adjacent utterances of the proposed speakers are too short for a reasonable sentence but form a syntactically and semantically correct sentence when assigned to the same speaker. Note, however, that the actually spoken source language words may be unknown at this point: according to an embodiment, any word surface, syntactic, or semantic information may be encoded only implicitly in the last layer of the proposed RNN encoder.

4. In one example embodiment, each vector sequence of the last RNN encoder layer between two predicted sentence boundaries may be used as input for the attention-based neural MT decoder. The MT decoder is thus exposed to the input that ideally corresponds to a real spoken sentence in one of the languages which the MT component can translate. In addition, any information on the source language(s) associated with the particular predicted sentence may also be provided as input to the MT decoder. The MT system architecture may choose to encode the input sequence in a recurrent neural network (uni-directionally or bi-directionally), summarizing it in a fixed representation. Alternatively, purely attention-based (e.g. transformer) architectures may be used. In another example embodiment, the direct speech translation component may process a variable number of RNN encoder inputs without any hard sentence boundaries, until it generates the last word of a target sentence translation. Based on the attention information, it then may restart processing the RNN encoder inputs which were still not given attention by the attention component of the RNN decoder.

5. To limit the number of events to which the network has to attend for each generated target word, the last layer of the RNN encoder can be transformed by further neural network layers which would summarize some of the input vectors into a smaller number of other vectors/matrices (through pooling or other methods) which roughly correspond to words or word parts. For instance, a sequence of 100 vectors per second corresponding to the sampling rate may be converted to a sequence of e-g. 4 or 5 vectors per second of a different dimension. This transformation may be trained end-to-end as part of the training procedure for the overall direct speech translation architecture (see Section "Training of the direct speech translation system" below).

6. The proposed multilingual direct speech translation component is trained not only to translate words and sentences in one of the source languages it supports, but also to generate punctuation marks and correct word case in the target language. It can also represent the translated speech in a normalized written form, for example, spoken numbers would be converted to digit sequences. This is achieved by training the end-to-end system on pairs (speech signal, target language sentence), in which the target language sentence includes proper punctuation, casing, and uses written forms of numbers, dates, etc.

7. In one example embodiment, the proposed multilingual direct speech translation component 520 may be trained to also predict named entity information for some of the words in the target language sentence that it generates. This can be done by leveraging human-labeled or automatically labeled training data (multilingual source language sentences and their translations into a single target language that include named entity labels).

8. The proposed multilingual direct speech translation component may also predict within-sentence breaks in the generated target language sentence. These breaks may correspond to the pauses within the spoken utterance and may be used by the TTS component to generate equivalent pauses in the target language speech so that the generated speech better corresponds to the source speech in terms of its start and duration. In case of subtitling as the final application, according to an embodiment, these breaks may be used to define subtitle frames and the duration of their appearance on the screen. Such breaks may be predicted, for example, based on pause duration in the source input and the attention mechanism of the MT decoder, but also other methods may be applied, utilizing in particular any human-labeled data in which such breaks are marked.

9. The proposed direct speech translation component may also take advantage of previous sentence context as defined by the predicted explicit or implicit sentence boundaries. This context may be assigned a separate attention in the architecture of the MT decoder. Since the predicted sentence boundaries may not always be completely accurate, for speech translation it is may become important to use additional preceding context, as compared to text translation with correct sentence boundaries. The context may help in disambiguation and thus result in better translation (e.g. of pronouns, names, etc.). In addition, according to an embodiment, the speaker and language change information may be used as additional context for improving MT quality, especially for translation of dialog turns.

The TTS component 530 takes a sequence of generated target sentences from the direct speech translation component 520, together with the time boundaries corresponding to the processed spoken source sentences, as well as the original source audio, and speaker segmentation and voice characteristics from component 510. This information may be used to generate speech audio output in the target language by perform the following jointly:

1. Generate target language speech for the given target sentence, using punctuation marks and word context information for better sounding speech. In one example embodiment, also the predicted named entity labels are used to acoustically emphasize words in the TTS-generated target language speech.

2. Generate target language speech which corresponds as much as possible to the equivalent source language speech in terms of time coordinates (beginning and duration of speech, including possible pauses after certain words and phrases). For this, according to one embodiment of the invention, the original speech event duration information from component 510 may be used together with any within-sentence breaks predicted by the direct speech translation system 520.

3. Generate target language speech which has the correct speaker change between automatic "speakers" whose voice characteristics resemble those of the original source language speakers, based on the voice characteristics information provided by the component (1).

Training of the Direct Speech Translation System

For training the neural network architecture of the direct speech translation component 520, according to an embodiment of the invention, the following steps may be implemented:

1. Pre-train the multilingual RNN encoder on a sequence of pairs (source language speech, source language sentence) using the usual human-transcribed speech training data for all supported source languages. If real sentence segmentation is not available (i.e. the human transcript consists of words only without punctuation marks), use automatic punctuation prediction method to predict sentence-final punctuation and thus define real sentence boundaries. As part of the pre-training, also train the predictor of the sentence boundaries that does not rely on the labels of the predicted source words. This may be done by assigning the reference sentence boundary label to the vector of the last RNN encoder layer that corresponds to the word end of the source word that ends the sentence.

2. Pre-train the multilingual MT decoder on a sequence of pairs (source language sentence, target language sentence) in text form using the standard bilingual parallel sentence-aligned MT training data for all of the supported language pairs (i.e. each of the supported source languages paired with the target language). Only the decoder parameters pre-trained in this step (without the attention parameters) may be used in subsequent training steps. Punctuation marks and case information is removed from the source sentences, and further desired transformations are performed to convert the source language text to spoken form, e.g. numbers are converted to their spoken form using regular-expression-based rules.

3. Use multilingual TTS that handles the supported source languages, with multiple representative speakers in terms of gender, age, and accent and representative sound environments in terms of channel, background noise, and room acoustics to generate artificial speech for all or part of source language sentences that were used as training data in step 2. Thus, the triples of (artificial source language speech, corresponding source language text sentence, target language text translation) are obtained.
4. Start the training of the direct (end-to-end) speech translation system, initializing the parameters of the RNN encoder with the parameters of the pre-trained encoder from step 1, as well as initializing the parameters of the MT decoder with the parameters of the pre-trained decoder from step 2. As training data, use real sentence triples (source language speech, its transcript, its translation) which are assumed to be available in limited quantities.
5. Continue training by alternating real training triples from step 4 with artificial training triples from step 3, for which speech is generated using multilingual TTS, until convergence.
6. As a further improvement to step 5, employ a multi-objective training scenario, in which both a source language sentence and a target language sentence are generated with two separate decoders, thus making sure that the distributed representation of the speech utterance does not deviate significantly from a representation that is required for high quality speech recognition in the source language, but at the same time its target language translation is also of high quality.
7. As a further improvement to step 5, employ a multi-task training scenario, where the target language sentences are predicted based on alternating input of source language speech (real or artificially generated with the TTS) or source language text. Here, two different encoders for speech and text (and possibly separate attention mechanisms) may be used. The multi-task training scenario may especially be helpful for better training of the MT decoder.

As a further improvement to step 5, one may go beyond single-sentence context in training and use the directly preceding spoken utterance(s) for encoding the previous context, for example, with a separate attention mechanism for this encoded context. This step generally may use full documents with sentences in their original (spoken) order as training data. For example, these documents could be recorded talks or lectures which are transcribed and translated without omissions. The separate representation of the previous context may also include speaker and language change information as described above.

FIG. 3 depicts a method of training and operating a multi-lingual direct speech translation system. In step 310, the TTS system may be trained based on prosody and sentiment data that is used to add this tonal dimension to the speech output in the target language. In step 320, the multi-lingual direct speech to text translation system receives an input speech signal in a source language for translation into a target language recognized by the system. In step 330, the source speech is translated into an output text stream in the target language. In step 340, a TTS system creates an audio output stream of speech based on the text in the target language. Optionally, the TTS system may receive prosody and/or sentiment information and further render the speech based on those characteristics.

Figure 4:
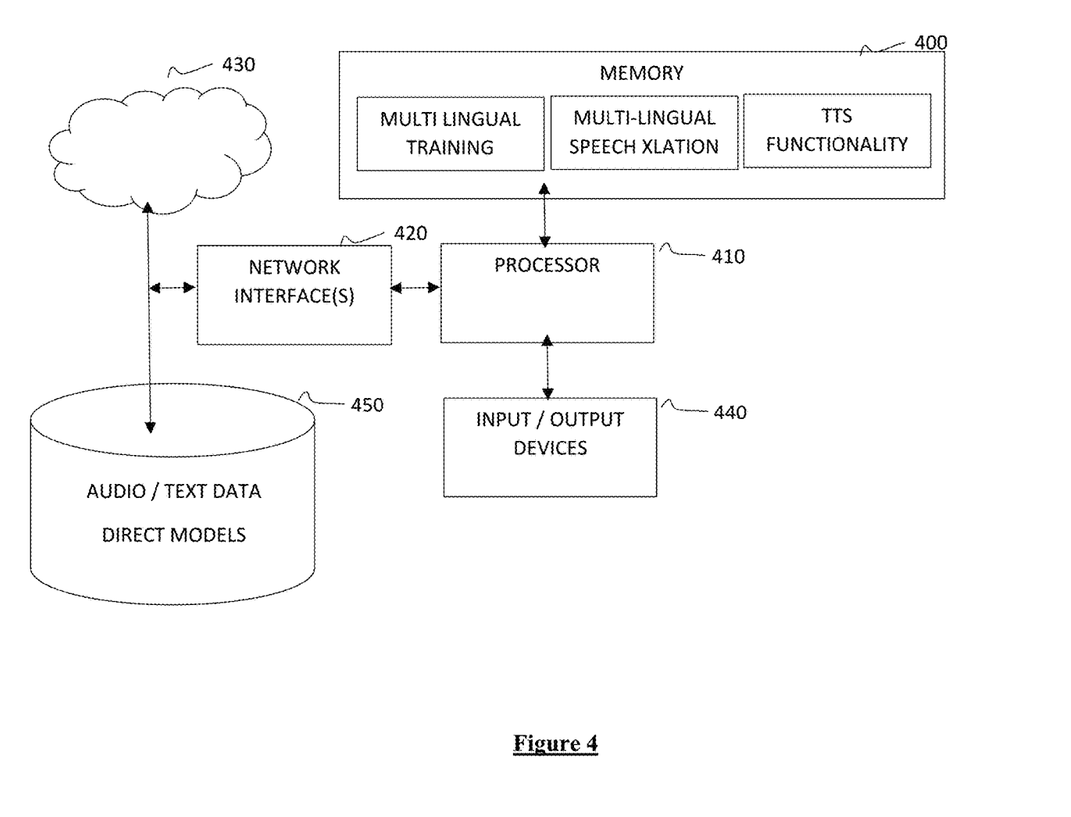
FIG. 4 depicts a system for training and operating direct multi-lingual speech translation according to an embodiment of the present invention.

FIG. 4 depicts a system for implementing a multi-lingual direct speech translation system. Referring to FIG. 4, a processor 410 is coupled to a memory 400, a network interface 420, a private network or the Internet 430, input output devices 440 including, for example, a microphone, speakers, keyboard, mouse, display, and/or touchscreen, and a database 450. The memory may store multiple programs that are comprised of computer program instructions that, when executed by the computer, cause the computer to perform the functions described herein. The memory may store, for example, one or more training programs for training the multi-lingual speech to text translation models and for training the TTS system to translate text in different languages to corresponding speech in the target language, including implementing prosody and sentiment information. The memory 400 may also store the training models, data and operational program for receiving an input stream of audio in a source language and translating that stream into target text, and then controlling the TTS system to output a target audio stream of speech in the target language. The processor 410 may execute the program introductions stored in the memory. The processor may receive speech from the network 430 or the database 450, for example in the form of audio streams associated with television or movie programs. Other types of speech signals may also be stored and made available. The database 450 and networks 430 may also be used to store models for direct speech to text translation and TTS, and training data such as audio files containing speech in different languages and corresponding text. The corresponding text may be in one language and extended to other language through TTS or the training data may include speech and corresponding text in multiple language or both speech and corresponding text in multiple languages. Any of the methods and functionality described herein may be implemented as program instructions stored in the memory and executed by the processor as described herein.

The terms component, module and system are used interchangeably herein and any of these may be implemented as program instructions stored in the memory that are executed by the processor to cause the computer to implement the component, module or system. It will be understood that while particular embodiments have been shown and described, changes may be made to those embodiments without departing from the spirit and scope of the invention.

The invention claimed is:

1. A multi-lingual system for translating a continuous stream of speech associated with at least two source languages into another target language, comprising:
  a memory, including program instructions, for performing direct speech translation with punctuation prediction for more than two language pairs using direct speech translation models associated with a system having been trained using (i) encoder-decoder architectures with attention mechanisms and training data using text-to-speech (TTS) and (ii) parallel text training data in more than two different languages;
  wherein the direct speech translation models have been trained based on prosody and sentiment characteristics, and are capable of producing punctuation prediction in translated text in at least one target language from at least two different source languages identifying sentence boundaries associated with semantic/syntactic units associated with machine translation, wherein the punctuation prediction is based on pauses and voice volume in input audio data and when present further based on at least one of speaker diarization metadata, language change metadata and hidden word sequence representation; and a processor coupled to the memory for executing the program instructions to use the direct speech translation models to process a continuous stream of input audio having speech therein spoken in at least one language corresponding to the at least two different source languages to create text output in a target language based on at least one of prosody and sentiment characteristics of the speech in the input audio stream.

2. The system according to claim 1, wherein the processor is configured to further execute program instructions to convert the text output into speech in the target language using TTS based on at least one of the prosody and the sentiment characteristics of the speech in the input audio stream.

3. The system according to claim 2, wherein the processor is configured to further execute program instructions to generate the target language text output with punctuation marks and casing.

4. The system according to claim 2, wherein the program instructions stored in the memory further include program instructions for receiving meta-information characteristics of speech in an input stream and adjusting characteristics of the TTS speech output based on the voice characteristics, including male/female, timing of speech, and volume of at least one speaker's voice present in the input speech in the input stream to mimic the at least one speaker's voice in the input speech.

5. The system according to claim 2, wherein the program instructions stored in the memory further include program instructions for receiving sentiment characteristics of speech in an input stream and adjusting prosody characteristics of the TTS speech output based on the sentiment characteristics.

6. The system according to claim 5, wherein the program instructions stored in the memory further include program instructions for receiving meta-information characteristics of speech in an input stream and adjusting characteristics of the TTS speech output based on the meta-information characteristics, wherein the meta-information characteristics include pitch, accent, speaker diarization, and language identification corresponding to a speaker of the input speech.

7. A method for translating a continuous stream of speech from at least two source languages into another target language, comprising:

training multi-lingual direct speech to text translation models for more than two language pairs with punctuation prediction using (i) encoder-decoder architectures with attention mechanisms and training data using text-to-speech (TTS) and (ii) parallel text training data in the more than two different language pairs;

wherein the training further includes training the models based on prosody and sentiment characteristics, and training based on pauses and voice volume in input audio data to create capability in at least two source languages and when present further based on at least one of speaker diarization metadata, language change metadata and hidden word sequence representation, to enable punctuation prediction in translated text in at least one target language identifying sentence boundaries associated with semantic/syntactic units used in machine translation;

processing a continuous input speech stream using the models in at least one of the languages among the at least two source languages to output a stream of text in a target language; and converting the text output into speech in the target language using TTS based on at least one of the prosody and the sentiment characteristics of the speech in the input speech stream.

8. The method according to claim 7, further comprising:
receiving prosody characteristics associated with the input speech in the input stream in another language and adjusting prosody characteristics of the TTS speech output in the target language based on the prosody characteristics, including timing of speech, volume and pitch of the speaker of the input speech.

9. The method according to claim 7, further comprising:
receiving sentiment characteristics associated with the input speech in the input stream in another language and adjusting the sentiment characteristics of the TTS speech output based on the sentiment characteristics of the speaker of the input speech.

10. A system for translating a continuous stream of speech associated with at least two source languages into another target language, comprising:

a memory storing respective voice activity, multi-lingual speech translation, and text to speech program instructions;

a processor, coupled to the memory and a source of speech signals, the processor configured to execute:

(i) voice activity program instructions to receive and process source speech signals within a continuous stream of audio and output language labels, speaker diarization and voice characteristics meta-information associated with the speech signals;

(ii) direct multi-lingual speech translation program instructions defining direct speech translation models that are capable of receiving and processing the source speech signals in at least two source languages and the output from executing voice activity program instructions to generate a text stream output in another target language, based on prosody and sentiment characteristics in the source speech signals, and with punctuation prediction information, wherein the punctuation prediction information identifies sentence boundaries associated with semantic/syntactic units associated with machine translation based on the language labels, diarization and voice characteristics meta-information; and (iii) text to speech program instructions to generate speech, based on the text stream output and punctuation prediction information, speaker diarization and voice characteristics meta-information, that mimics in the speech translated to the target language a speaker's voice reflected in the source speech signals.

11. The system according to claim 10, wherein the memory further includes subtitle segmentation program instructions and the processor is configured to execute the subtitle segmentation program instructions to generate subtitles in the target language corresponding to the source speech.

12. The system according to claim 10, where the direct multi-lingual speech translation program instructions are configured to determine when executed by the processor predicted sentence boundaries based on the speaker diarization and language labeling and generate full-sentence target language translation based on the predicted sentence boundaries.

13. A system for training a multi-lingual direct speech to text translation system to translate a continuous stream of speech from at least two source languages into another target language, comprising:
- a memory, including program instructions for training direct speech translation models using multilingual encoder-decoder architectures with attention mechanisms to translate speech from at least two source languages to another target language based on prosody and sentiment characteristics;
- a text-to-speech (TTS) system associated with the target language that generates speech from source text in the target language; and
- a processor coupled to the memory and a source of speech in at least one source language for translation to the target language, the processor configured to execute the program instructions, to produce training data using the TTS system and the source language side of parallel text training data, including multilingual parallel data with different source languages, and wherein the produced training data includes the TTS generated speech signal generated from the parallel data; and
- wherein the processor further executes program instructions to train the direct speech translation models based on prosody and sentiment characteristics and to produce punctuation prediction in translated text in the target language identifying sentence boundaries associated with semantic/syntactic units associated with machine translation, wherein the punctuation prediction is based on pauses and voice volume in input audio data with capability in at least two source languages and when present further based on at least one of speaker diarization metadata, language change metadata and hidden word sequence representation when present.

14. The system according to claim 13, wherein the processor is further configured to execute program instructions to process multi-lingual parallel training data to train an end-to-end multi-lingual speech-to-speech system.

15. The system according to claim 14, wherein the processor is further configured to execute program instructions to perform multilingual, multi-objective training to enhance the model training multi-lingual parallel training data to train the end-to-end multi-lingual speech-to-speech system.

16. The system according to claim 13, wherein the processor is further configured to execute program instructions to execute multilingual, multi-task training to enhance the model training.

* * * * *